UNITED STATES PATENT OFFICE 2,373,705

MANUFACTURE OF AMINES

John Frank Olin, Grosse Ile, and Edward John Schwoegler, Wyandotte, Mich., assignors to Sharples Chemicals Inc., Philadelphia, Pa., a corporation of Delaware No Drawing. Application November 25, 1941, Serial No. 420,344

6 Claims. (Cl. 260—583)

The present invention pertains to the manufacture of amines by reaction of aliphatic aldehydes with aminating agents such as ammonia and aliphatic amines, and with hydrogen. It involves a process which depends upon the fundamental reaction discovered by Mignonac and reported in "Comptes Rendus," volume 172, page 223.

In accordance with this general process, as developed by Mignonac and others, the aminating agent is mixed with an aldehyde or ketone in the presence of hydrogen, and the mixture is subjected, in liquid phase, under the pressure of hydrogen, to a temperature above the minimum reaction temperature at which the desired condensation reaction occurs, and below the temperature of decomposition of the desired amine. In most cases, a mutual solvent, such as a monohydric primary, secondary or tertiary alcohol, a polyhydric alcohol or water, is employed, in order to facilitate contact of the reactants or otherwise promote the reaction, although the presence of such a mutual solvent is not in all cases necessary.

While the Mignonac process, as above described, represents an important development in the field of manufacture of amines, the yields and conversions attained in the practice of the process are, in some cases, relatively low, and it is the object of the present invention to improve the yields and conversions attainable in a process of this general type. It is particularly difficult to obtain good yields and conversions in the condensation of aliphatic aldehydes with strongly basic aminating agents in the Mignonac process, and a particular feature of the present invention consists in the provision of a process by which excellent yields and conversions may be obtained in such amination reactions.

The present invention includes a process of aminating aldehydes of the types discussed above by treatment of such compounds in the liquid phase in an atmosphere of hydrogen and in the presence of a hydrogenation catalyst, with an aminating agent which may be ammonia, an aliphatic or cyclo aliphatic amine, so long as the aminating agent contains a hydrogen atom capable of being replaced by an alkyl radical.

In the practice of the present invention, instead of maintaining the entire body of aldehyde to be aminated in contact with the aminating agent, hydrogen and hydrogenating catalyst while heating the mixture under hydrogen pressure until the reaction has been completed, the aminating agent and hydrogenation catalyst, which may be any of the hydrogenation catalysts useful in the practice of this general process as taught in the prior art, are maintained in liquid phase in an atmosphere of hydrogen under pressure, and the aldehyde to be aminated is gradually introduced into the resulting mixture while that mixture is maintained at the desired reaction temperature. The aldehyde is progressively introduced into the reaction mixture during the course of the reaction, and care is taken to avoid introduction of this aldehyde progressively at an average rate which is substantially greater than the rate of accomplishment of the desired reaction to effect condensation of the aldehyde with the aminating agent and hydrogen to form the desired amine. By operating in this manner, we have found that undesired side reactions can be largely eliminated, and the yield of the desired amine very considerably improved.

The invention is especially useful in the amination of aliphatic aldehydes, since particular difficulty has heretofore been encountered in amination of these compounds by the Mignonac process, this being especially true in cases in which the aminating agent is a strongly basic compound, such as ammonia or a mono- or di-aliphatic or -cycloaliphatic amine. In the manufacture of amines by condensation of strongly basic aminating agents with aldehydes and hydrogen, particular difficulty has been encountered due to formation of undesired by-products, including products resulting from polymerization of the aldehyde, due to the catalytic effect of the basic aminating agent. This by-product formation is avoided in the practice of the present invention by avoiding the presence in the reaction mixture in contact with the aminating agent of any very large proportion of the aldehyde which is subjected to the condensation reaction. By introducing the aldehyde progressively, and maintaining the average rate of introduction substantially equal to the rate at which the aldehyde already introduced is used up in manufacture of the desired amine, polymerization of the aldehyde is minimized, with the result that very greatly improved conversions and yields are attained.

Substantial variation in temperature and pressure conditions is possible in the practice of the present invention, these conditions being similar to those involved in practice of the prior art. In general, it may be said that the aldehyde is progressively introduced into a liquid body of the aminating agent containing a hydrogenation catalyst, the mixture of aminating agent and catalyst being maintained at a temperature at which the condensation reaction takes place during this introduction of the aldehyde. This temperature may be any temperature at which the desired condensation takes place; e. g., at a point within the range between 50 and 250° C., depending upon the particular aminating agent, aldehyde and catalyst. The catalyst may be any hydrogenation catalyst such as those previously employed in reactions of this type, a metallic nickel catalyst being preferred. Since the reaction is strongly exothermic, it may be desirable to cool the reaction vessel during the course of the reaction, in order to maintain the temperature substantially uniform during the introduction of the aldehyde, and at a point at which the formation of undesired by-products is minimized. The reaction mixture is maintained under hydrogen pressure throughout the reaction, this pressure being sufficient to maintain the reactants and resultants of the reaction in the liquid phase. Hydrogen may be added as required during the course of the reaction in order to replace hydrogen used up in the course of the hydrogenation reaction by which the amines are produced. These and other conditions may be adjusted in a manner which is well known to those skilled in this art, as these conditions form no part of the present invention, which consists in the progressive introduction of the aldehyde, rather than in the other reaction conditions.

As an illustration of the practice of the invention, a solvent such as an aliphatic alcohol or glycerine, which dissolves both the aminating agent and the carbonyl compound entering into the reaction, is placed in an autoclave with approximately 2% of a nickel catalyst and the aminating agent. Hydrogen is then introduced until a pressure which may be approximately 800 lbs. per square inch is attained. The mixture in the autoclave is vigorously stirred, and the contents are heated to a temperature which may be in the neighborhood of 150° C. At this temperature the operator starts pumping the aldehyde to be aminated gradually into the autoclave. The rate of addition of the aldehyde will depend upon the rate of conversion of this compound to the desired amine, and will depend upon the molecular weight of the aldehyde and other factors as discussed above. As reaction occurs, a temperature rise will also occur due to the exothermic nature of the reaction, and it may become desirable to subject the reaction vessel to artificial cooling or stop the addition of aldehyde for a time during the practice of the process in order to avoid such a substantial increase in temperature as to cause decomposition or undesirable side reactions. Hydrogen may be continually added at the same time that the aldehyde is added. This procedure will be continued until all of the aldehyde to be aminated has been added, and the pressure of the reaction vessel indicates that hydrogen absorption has ceased. After the conclusion of the reaction, the reaction products may be worked up by direct distillation or acidification followed by distillation, as will be well understood by those skilled in the art.

The following examples illustrate the practice of the invention.

*Example I*

2000 ml. of glycerine and 20 g. of Raney nickel (suspended in butanone-2) were placed in a 3000 pound stainless steel autoclave which had been fitted with a 3000 pound Hills-McCanna pump. 408 g. of liquid ammonia (24 mols) were then added to the solvent and hydrogen was introduced to a total pressure of 1080 pounds per square inch. This mixture was heated to 155° C. while being agitated and at this temperature n-butyraldehyde (1368 g.; 19 mols) was slowly pumped into the autoclave over a period of 55 minutes. During the course of reaction the temperature was maintained between 155 and 180° C. and hydrogen was continually added, the pressure being maintained between 850 and 1600 pounds per square inch. After removing the products from the autoclave, and working up the products, 1179 g. of monobutylamine (B. P. 77–78° C.) and 71.5 g. of dibutylamine (B. P. 159–161° C.) were obtained. No aldehyde was recovered. These values correspond to an 85% conversion and yield to monobutylamine and 5.25% conversion and yield to dibutylamine based on the aldehyde.

A similar run using 2000 ml. of water as solvent and 15 g. of Raney nickel catalyst gave a conversion of 53% to monobutylamine and 23.8% conversion to dibutylamine based on the aldehyde. Use of water increases the dibutylamine formation. Other runs were made using a water-methanol mixture as solvent.

*Example II*

1500 ml. of methanol and 25 g. of Raney nickel (suspended in butanone-2) were placed in a 3000 pound stainless steel autoclave equipped with a 3000 pound Hills-McCanna pump. 680 g. (40 mols) of anhydrous ammonia were then added to the autoclave and hydrogen introduced to a total pressure of 980 pounds per square inch. This mixture was then heated to 138° C. while being agitated and 1740 g. (30 mols) of propionaldehyde slowly pumped into the autoclave over a period of 30 minutes. The temperature of reaction was maintained between 155 and 165° C. during the absorption of hydrogen. The total pressure (mostly hydrogen) varied between 580 and 1900 pounds per square inch. Upon working up the products 1436 g. of monopropylamine (B. P. 47–48° C.) corresponding to a conversion and yield of 81.33% based on aldehyde were obtained. 143 g. of alpha methylamylamine (B. P. 128–130° C.) were also obtained which corresponds to a conversion and yield of 8.1%.

*Example III*

1405 g. (23.8 mols) of n-propylamine were placed in a 3000 pound stainless steel autoclave that had been equipped with a 3000 pound Hills-McCanna pump. The catalyst, 30 g. of Raney nickel which was suspended in water and dried by washing with acetone, was also placed in the autoclave, but no solvent was added. Hydrogen was then introduced to a pressure of 780 pounds per square inch and the mixture heated to 175° C. with agitation and the propionaldehyde slowly pumped in over a period of 65 minutes. Absorption of hydrogen occurred and the pressure of hydrogen varied between 740 and 1500 pounds per square inch during the reaction. The reaction temperature was maintained between 162 and 195° C. Upon distilling the products 1380 g. of dipropylamine (B. P. 108–110° C.) were obtained which corresponded to a 48.0% conversion and yield based on aldehyde. In addition 219 g. of tripropylamine (B. P. 153–156° C.) were also obtained which corresponds to a conversion and yield of 9.6% based on the aldehyde.

Modifications will be obvious to those skilled in the art, and we do not therefore wish to be limited except by the scope of the following claims.

We claim:

1. In the formation of amines by the catalytic reaction of hydrogen and an aliphatic aldehyde with an aminating agent chosen from the class consisting of ammonia and aliphatic amines having an unsubstituted hydrogen atom, the process comprising introducing a body of the aminating agent into a reaction vessel and maintaining that body of aminating agent under hydrogen pressure in liquid phase in the presence of a hydrogenating catalyst maintained in said reaction vessel and introducing the aldehyde progressively into said body of aminating agent while said body of aminating agent is maintained in liquid phase under hydrogen pressure at a temperature between 50 and 250° C.

2. In the formation of amines by the catalytic reaction of hydrogen and an aliphatic aldehyde with an aminating agent chosen from the class consisting of ammonia and aliphatic amines having an unsubstituted hydrogen atom, the process comprising introducing a body of the aminating agent into a reaction vessel and maintaining that body of aminating agent under hydrogen pressure in liquid phase in the presence of a hydrogenating catalyst maintained in said reaction vessel and introducing the aldehyde progressively at an average rate which does not substantially exceed the rate of reaction to form the desired amine into said body of aminating agent while said body of aminating agent is maintained in liquid phase under hydrogen pressure at a temperature between 50 and 250° C.

3. In the formation of amines by the catalytic reaction of hydrogen and an aliphatic aldehyde with ammonia, the process comprising introducing a body of ammonia into a reaction vessel and maintaining said body of ammonia under hydrogen pressure in liquid phase in the presence of a hydrogenating catalyst maintained in said reaction vessel and introducing the aldehyde progressively into said body of ammonia while said body of ammonia is maintained in liquid phase under hydrogen pressure at a temperature between 50 and 250° C.

4. In the formation of amines by the catalytic reaction of hydrogen and an aliphatic aldehyde with ammonia, the process comprising introducing a body of ammonia into a reaction vessel and maintaining said body of ammonia under hydrogen pressure in liquid phase in the presence of a hydrogenating catalyst maintained in said reaction vessel and introducing the aldehyde progressively at an average rate which does not substantially exceed the rate of reaction to form the desired amine into said body of ammonia while said body of ammonia is maintained in liquid phase under hydrogen pressure at a temperature between 50 and 250° C.

5. In the formation of amines by the catalytic reaction of hydrogen and an aliphatic aldehyde with an aliphatic amine having an unsubstituted hydrogen atom, the process comprising introducing a body of the aliphatic amine into a reaction vessel and maintaining that body of aliphatic amine under hydrogen pressure in liquid phase in the presence of hydrogenating catalyst maintained in said reaction vessel and introducing the aldehyde progressively into said body of aliphatic amine while said body of aliphatic amine is maintained in liquid phase under hydrogen pressure at a temperature between 50 and 250° C.

6. In the formation of amines by the catalytic reaction of hydrogen and an aliphatic aldehyde with an aliphatic amine having an unsubstituted hydrogen atom, the process comprising introducing a body of the aliphatic amine into a reaction vessel and maintaining that body of aliphatic amine under hydrogen pressure in liquid phase in the presence of a hydrogenating catalyst maintained in said reaction vessel and introducing the aldehyde progressively at an average rate which does not substantially exceed the rate of reaction to form the desired amine into said body of aliphatic amine while said body of aliphatic amine is maintained in liquid phase under hydrogen pressure at a temperature between 50 and 250° C.

JOHN FRANK OLIN.
EDWARD JOHN SCHWOEGLER.